United States Patent [19]
Lovejoy

[11] 3,905,740
[45] Sept. 16, 1975

[54] MOLDING APPARATUS
[75] Inventor: Walter R. Lovejoy, Elmhurst, Ill.
[73] Assignee: Beatrice Foods Co., Chicago, Ill.
[22] Filed: Nov. 19, 1973
[21] Appl. No.: 416,928

[52] U.S. Cl. ............... 425/438; 425/249; 424/468; 249/66; 249/63
[51] Int. Cl. .......................... B29c 1/06; B29c 1/16
[58] Field of Search ........... 425/249, 468, 242, 438, 425/441, 443–444, 450, 436; 249/63–64, 66–68

[56] References Cited
UNITED STATES PATENTS

| | | | |
|---|---|---|---|
| 3,289,252 | 12/1966 | Bromley | 425/249 |
| 3,373,460 | 3/1968 | Ladney | 249/63 |
| 3,509,603 | 5/1970 | Halsall et al. | 425/249 |

*Primary Examiner*—Francis S. Husar
*Assistant Examiner*—R. J. Charvat
*Attorney, Agent, or Firm*—Hume, Clement, Brinks, Willian, Olds & Cook, Ltd.

[57] ABSTRACT

An injection mold for making a polygonal plastic article having a closed bottom and an open top is disclosed. A first mold section corresponds to the exterior dimensions of the bottom wall and a portion of the contiguous side walls of the article while a second mold section composed of plural elements defines the interior surface of the article. Plural side wall elements are movable relative to both of the mold sections from an open position spaced from both sections to a closed position wherein the side wall members interlock with both mold sections to form the mold enclosure. Linkage elements interconnect various of the mold elements to provide a coordinated movement. Other features are disclosed.

6 Claims, 7 Drawing Figures

3,905,740

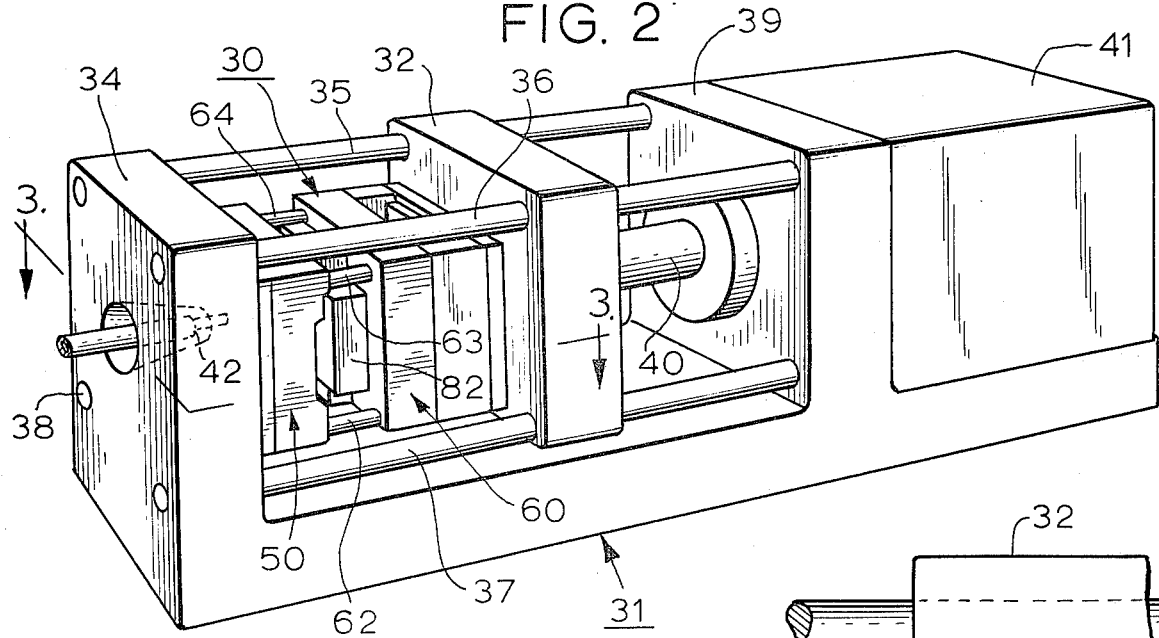
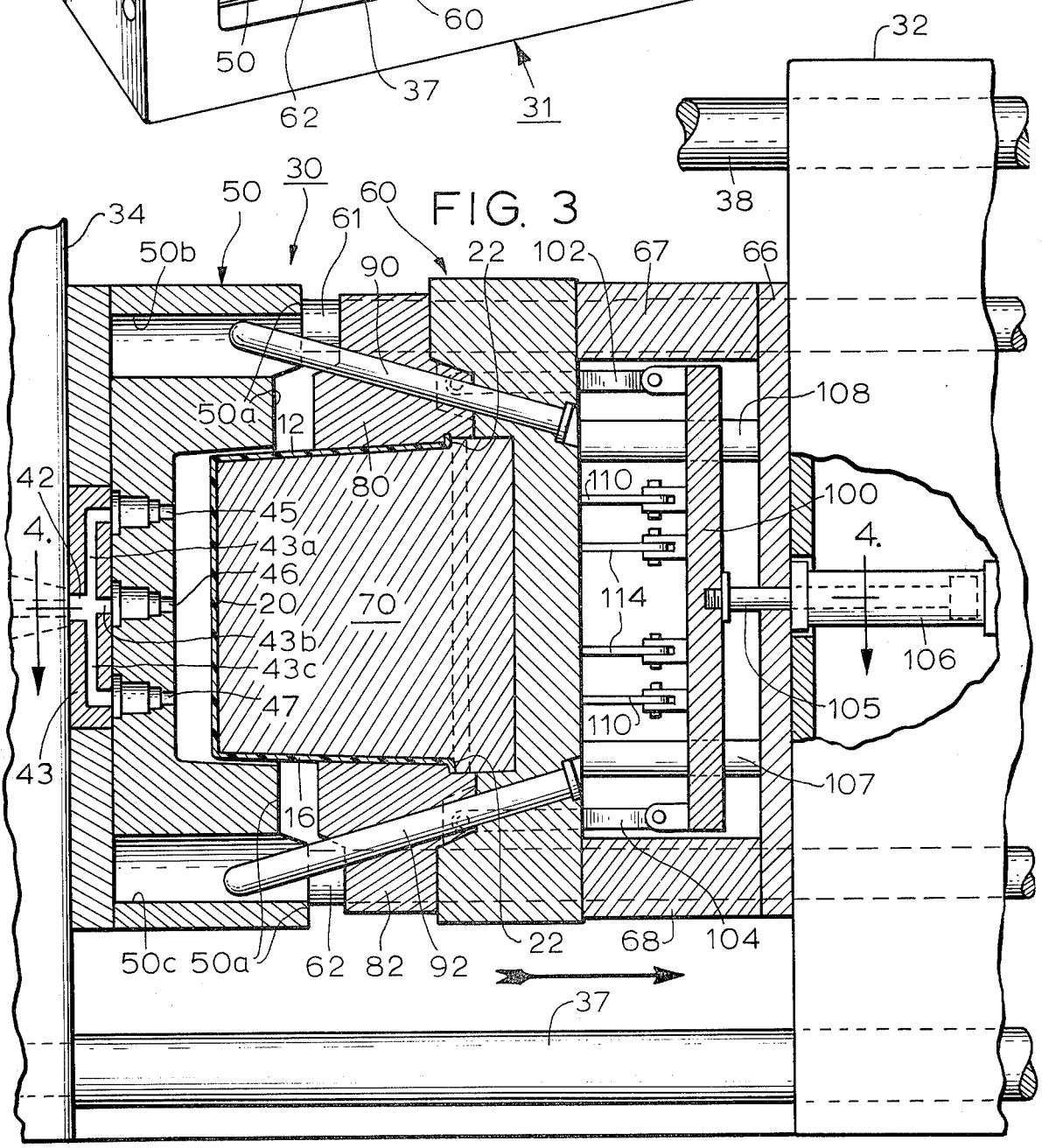

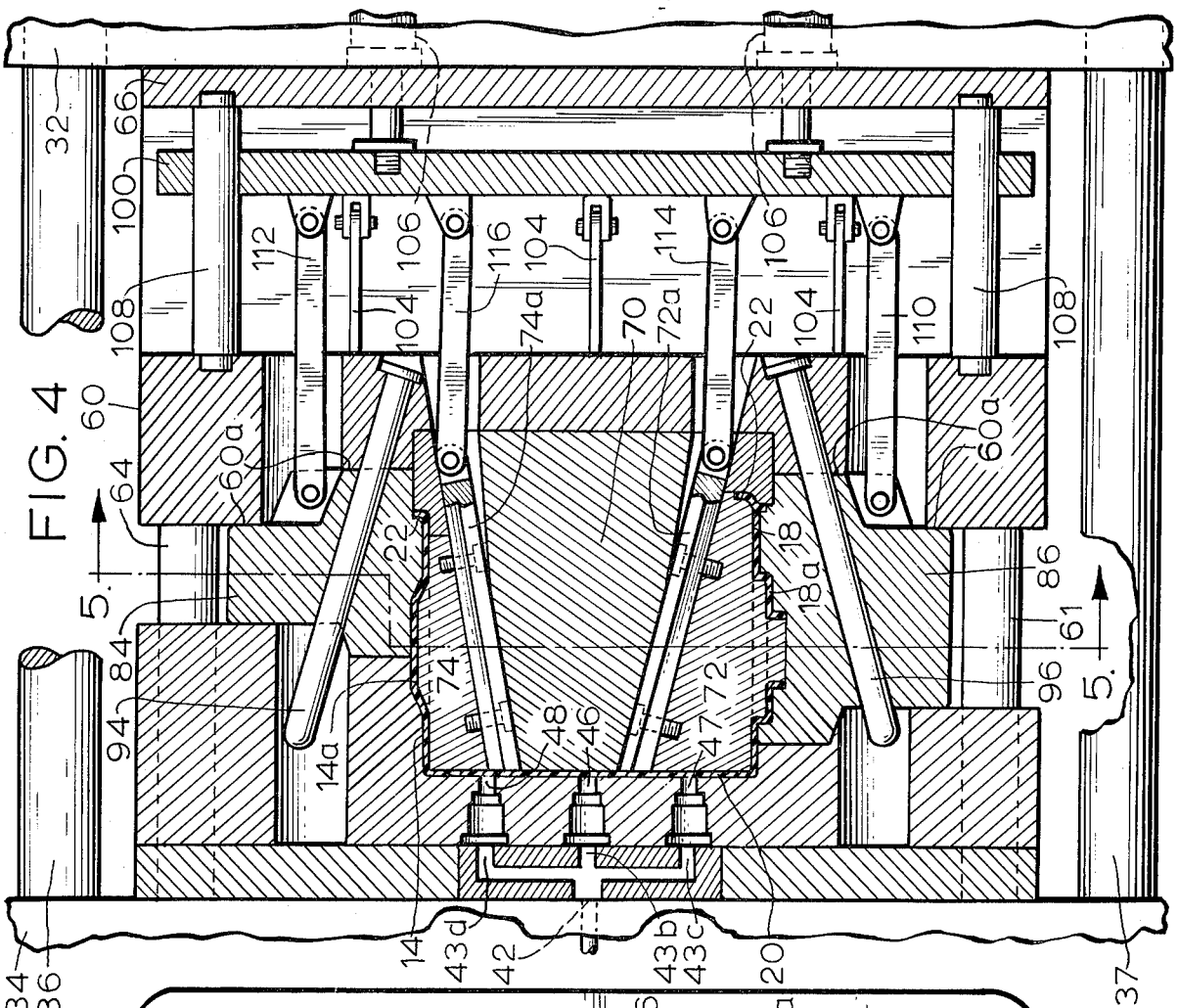
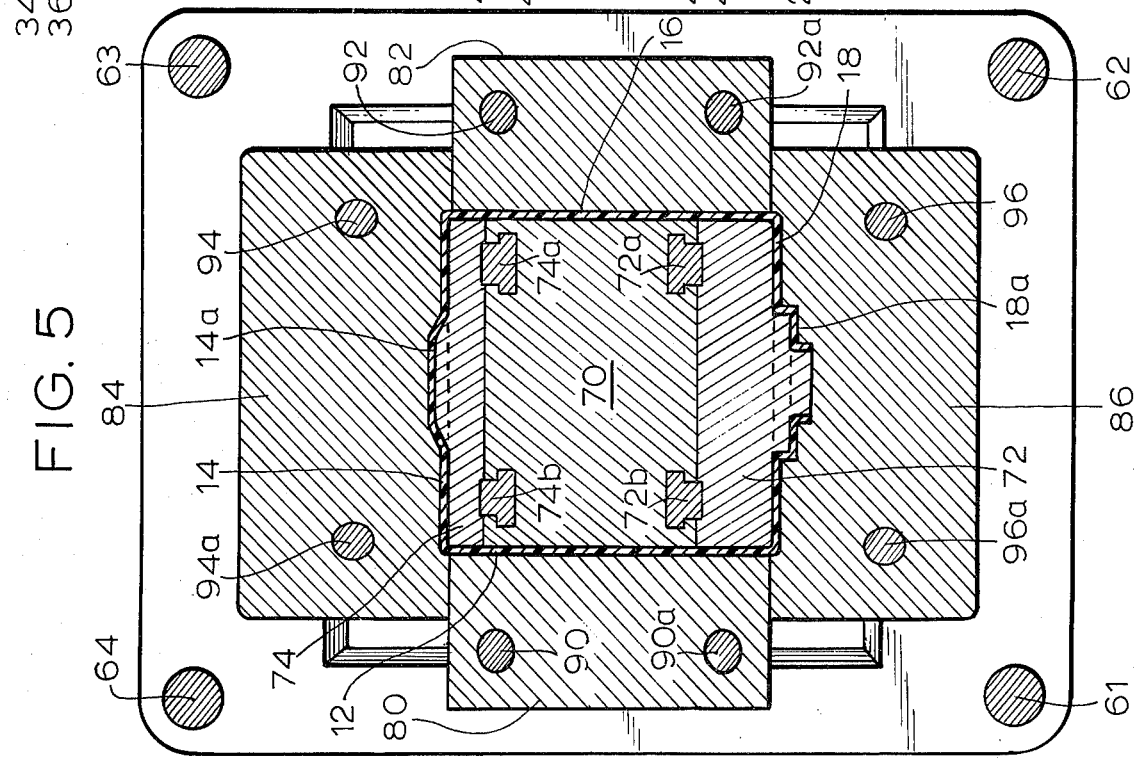

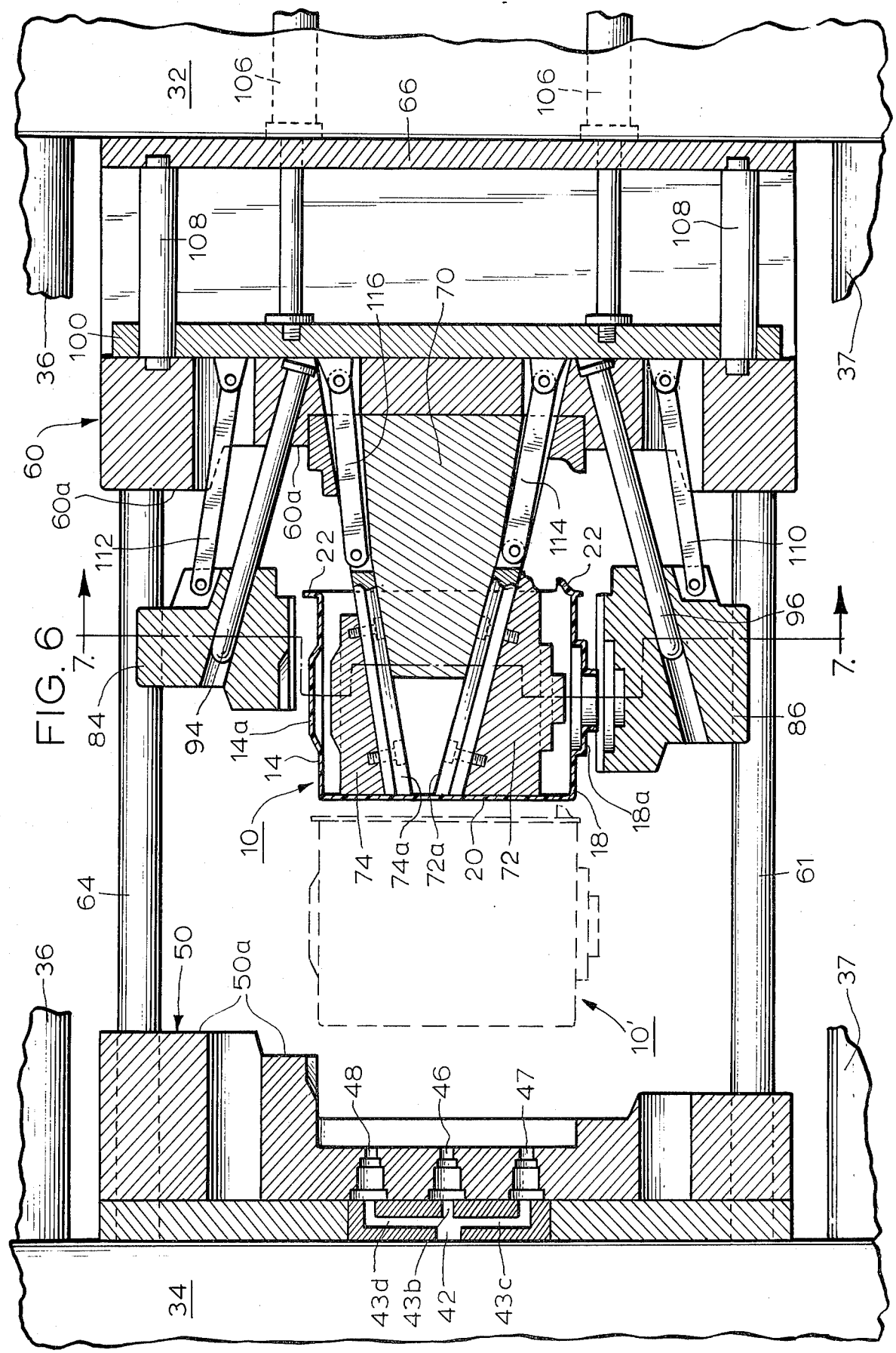

MOLDING APPARATUS

INTRODUCTION

The present invention relates generally to injection molding apparatus. More particularly, the present invention is directed to a new and improved injection mold for manufacture of polygonal plastics articles of a type having a closed bottom wall and an open top.

SUMMARY OF THE INVENTION

The mold structure of the invention is of a simplified construction which affords convenient access to each of the individual mold components and the mold cavity region. The mold elements are operated in an appropriately coordinated fashion by means of mechanical linkages and mechanical interlocks between the mold components thereby obviating the need for hydraulic cylinders and the like.

The mold design of the invention also facilitates introduction of the plastic material into the mold at any of a variety of desired locations.

Accordingly, the invention is directed to an injection mold for manufacture of a plastic article having four side walls and only one closed end wall forming a generally rectangular enclosure with an open top. A first mold means provides a mold defining surface corresponding to the exterior dimensions of a predetermined portion of the article including the closed end wall. A core mold means includes a plurality of relatively movable members cooperatively defining in their closed position a mold core corresponding to the interior dimensions of the article. At least one of the movable core members is displaceable along a predetermined path including both lateral and longitudinal components in moving between its closed and open position. A second mold means is provided for supporting the core means and it is also movable relative to the first mold means. A side wall mold means comprises four separable side wall members movable between a closed position in which the four members cooperatively form a mold defining surface corresponding to the exterior dimensions of at least a portion of the contiguous four side walls of the article and an open position in which the side wall members are displaced laterally and longitudinally of their closed position. There is further included an ejection means comprising an ejection plate movable between a first and second spaced position and separate mechanical linkage elements coupled between the ejection plate and the one core mold member and the four side wall members. The linkage elements are constructed and arranged for displacing the one core mold member and the four side wall members at a like longitudinal rate with movement of the ejector plate between the first and second positions. Additional facets of the mold apparatus of the invention are considered in detail hereinafter.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

FIG. 2 is a semi-schematic, perspective view of a preferred embodiment of the mold apparatus of the invention;

FIG. 3 is a longitudinal section of the mold apparatus taken along lines 3—3 of FIG. 2, but showing the external mold sections separating and moving toward an open position thereby to eject a molded part;

FIG. 4 is a sectional view of the mold apparatus taken along lines 4—4 of FIG. 3 and showing the mold components in their closed or molding position;

FIG. 5 is a sectional view taken along lines 5—5 of FIG. 4;

FIG. 6 is a sectional view similar to that of FIG. 4 but showing the mold apparatus in its open position with a molded article about to be ejected from the mold.

DESCRIPTION OF THE PREFERRED EMBODIMENTS

Figure 1:
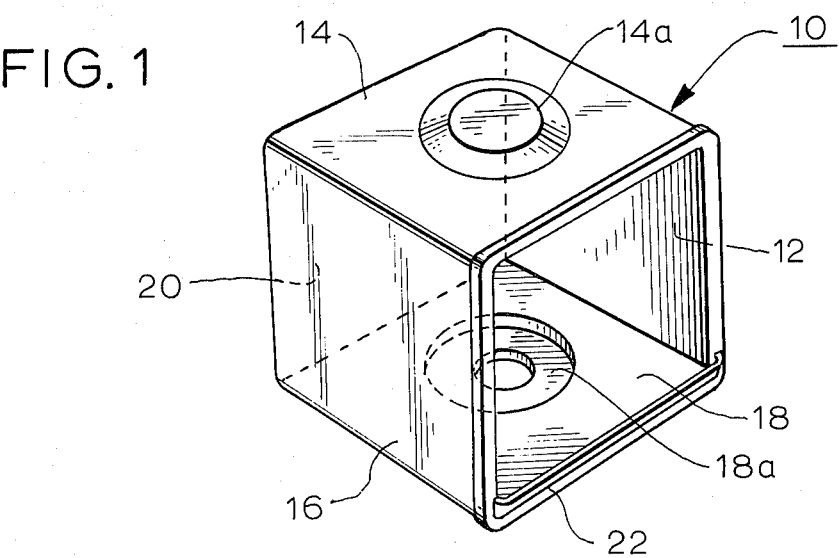
FIG. 1 is a perspective view of a typical molded plastic article made by the mold apparatus of the present invention.
Figure 7:
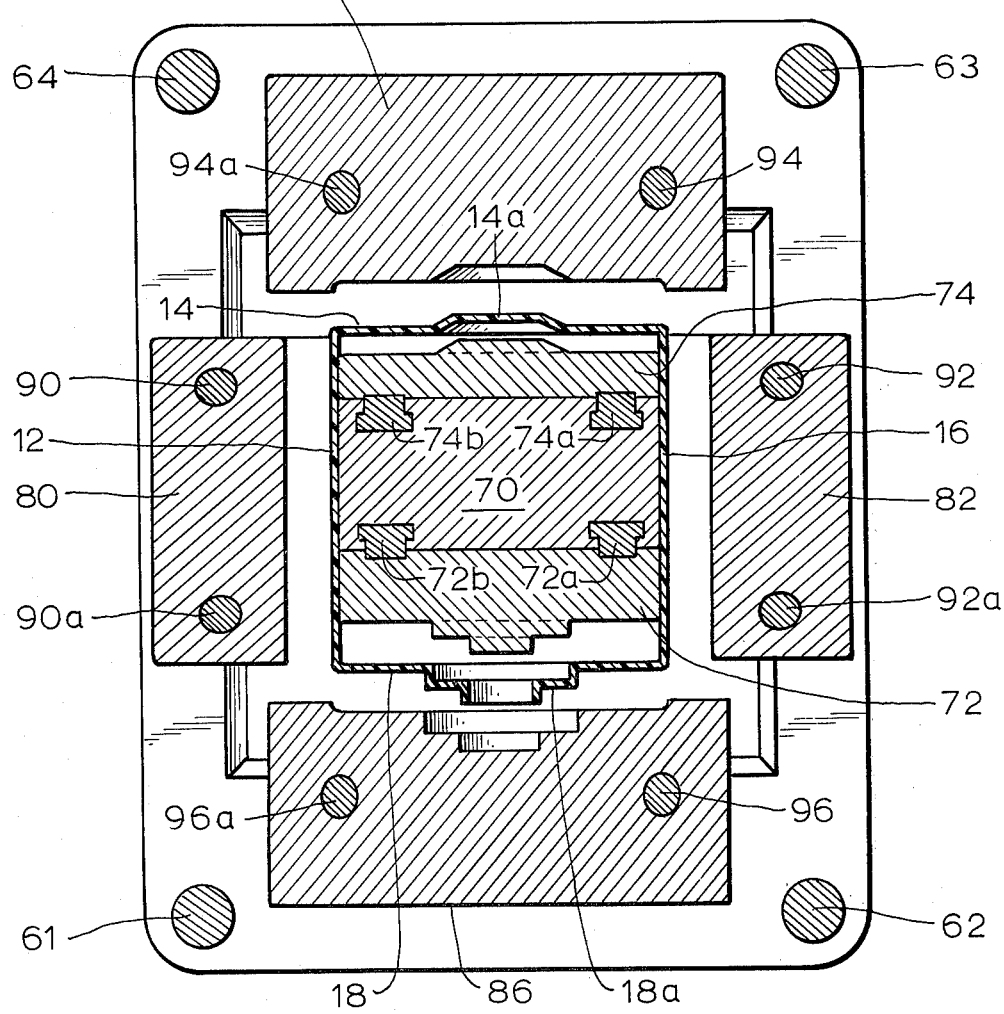
FIG. 7 is a sectional view taken along lines 7—7 of FIG. 6.

Referring now to FIG. 1, there is semi-schematically illustrated a molded plastic article 10 manufactured by the presently to be described mold apparatus of the present invention. The plastic article 10 is of generally rectangular, box-like configuration having four sidewalls 12, 14, 16 and 18, a bottom wall 20, only visible in phantom outline in FIG. 1, and an open top about which there is disposed an externally flared circumferential flange 22. The article 10 in the present embodiment is the tub of an automatic dishwasher of the familiar home appliance type. To accommodate certain of the dishwasher structure (not shown), the sidewalls 14 and 18 are sculptured and the latter is apertured, although it will be recognized that the details of the structure of the plastic article 10 are not pertinent to the present invention. Indeed, those skilled in the art will appreciate that the teachings of the present invention apply to manufacture of a wide range of polygonal molded plastic articles.

Referring now to FIG. 2, there is provided a somewhat simplified illustration of the mold 30 used to manufacture the plastic article 10 of FIG. 1. The mold 30 is shown supported in a horizontal hydraulic molding press 31 of conventional design with separable sections of the mold 30 carried respectively by a slidably movable platen 32 and a similarly sized fixed platen 34 disposed in opposed facing relation platen 32. A set of four horizontal guide posts 35–38 are fixedly secured adjacent the four corners of platen 34 and extend in parallel relation through the movable platen 32 and are fixedly secured in a stationary backing plate 39. The platen 32 is slidably movable along the guide posts 35–38 between a closed or molding position shown in FIG. 1 and an open or ejection position presently to be described. The platen 32 moves under the influence of a piston arm 40 that is powered by a hydraulic cylinder located in the housing 41 of the press 31.

In the present embodiment, the molten thermoplastic material is introduced into the molding cavity of mold 30 through a primary inlet sprue 42 which enters the mold structure from the backside of the platen 34. The plastic is introduced into the mold through five inlet gates arrayed like the numeral five representation of one of a pair of dice and at a location corresponding to the exterior of the bottom wall 20 of the article 10 of FIG. 1. The particular gating technique is of no pertinence to the present invention. However, one feature of the present invention is that the mold 30 facilitates gating at any of a wide range of desired locations which is a particular advantage in the manufacture of difficult to mold articles.

The structure of the mold apparatus 30 is best understood by reference to FIGS. 3-7. In FIG. 3, the mold 30 is illustrated with the mold sections just beginning to separate as the movable platen 32 is displaced rightwardly as indicated by the arrow toward an open position to permit ejection of the molded article 10. It will be understood that the thermoplastic material was earlier ejected into the mold cavity through a flow path comprising the primary inlet sprue 42, a series of parallel branches of a hot runner bar and each of five inlet gates connected to respective ones of the hot runner branch channels. Three of the branches 43a, 43b and 43c of conventional hot runner bar 43 and three associated inlet gates 45, 46 and 47 are visible in FIG. 3. The inlet gates 46-48 and the two additional gates not visible in this figure all enter the mold cavity at spaced positions corresponding to the exterior surface of the bottom wall 20 of the molded article in the numeral five die type pattern, previously mentioned. An additional inlet gate 49 and an associated branch 43d of the hot runner 43 is visible in FIG. 4. The sidewalls 12 and 16 of the article 10 are also visible in the sectional view of FIG. 3.

The mold 30 comprises a first mold means or section 50 fixedly secured to the stationary platen 34 and having a mold defining surface corresponding to the exterior dimensions of the bottom wall 20 and first portions of the respective sidewalls 12, 14, 16 and 18 of the article 10. As shown, the mold defining surface of the mold means 50 extends a substantial part of the length of the sidewalls, the parting line surface of the first mold means 50 being depicted by the numeral 50a. The circumferential parting line 50a defines a plane approximately transverse to the sidewalls of the article 10 in the region adjacent the article sidewalls, but a predetermined distance outwardly therefrom the parting line surface slopes forwardly and outwardly to a second planner plateau, likewise defined by the numeral 50a. Thus, the first mold means 50 includes a sturdy circumferential flange, the purpose of which shall be explained later herein. The mold section 50 is also provided with appropriate clearance bores for a series of inclined guide posts carried on the mating mold section presently to be described. Exemplary ones of these clearance bores are designated by the numerals 50b and 50c in FIG. 3. The first mold section 50 also supports the structure of the gating system for introduction of the thermoplastic material into the mold cavity. The gating system which has already been described will not be considered in further detail since such is well understood to those skilled in the art and forms no part of the present invention.

A second mold means or section 60 is fixedly secured to the movable platen 32 and is disposed in opposed facing relation to the first mold section 50. The second mold section 60 is of an enlarged, generally plate-like configuration having a planar back wall and a flanged forward wall contoured similarly to that of the opposed portion of the first mold section 50. Specifically, a parting line 60a of the second mold section is of the same contour as the parting line 50a of the first mold section 50. There is thus formed a circumferential flange adjacent the external perimeter of the second mold section 60, the purpose of which likewise will be explained later herein.

The second mold section 60 is slidably carried on a second set of rectangularly arrayed guide posts that are spaced well within the perimeter of the first guide post array 35-38. Two of these guide posts 61, 62 are visible in FIG. 3. The remaining guide posts 63, 64 of the second array are visible in FIGS. 4 and 5. The guide posts 61-64 each have one end fixedly in the first mold section 50 and extend therefrom through respective bores in the second mold section 60 and guide bores in the movable platen 32.

The second mold means 60 supports the core mold means, one of the plural sections of which, 70, is visible in FIG. 3. As will presently be explained in greater detail, the core section 70 is fixedly secured to the second mold means 60 and is the central one of a trio of core elements, the outer elements being movable to enable release of the plastic article 10 from the mold.

Control mechanism for actuation of the movable core elements and sidewall mold components presently to be described is positioned rearwardly of the second mold section 60. To accommodate movement of this control mechanism, there is provided a spacer structure between the platen 32 and the backside of the second mold means 60. The spacer structure comprises a backing plate 66 that is both contiguous and affixed to the movable platen 32, and a series of four spacer blocks interposed in a rectangular array between platen 32 and the backside of the second mold section 60. Only two of these spacer blocks 67, 68 are visible in the drawings.

The mold 30 further includes a sidewall mold means comprising four separable sidewall members, two of which 80 and 82 are visible in FIG. 3. The other two sidewalls 84 and 86 are visible in FIG. 4. The sidewall members are interposed between the first and second mold sections and in the closed position of the mold shown in FIG. 4 cooperate with the first mold section 50 to define the exterior sidewall contour of the molded article 10. The sidewall members have a contour complementary to the respective mold parting surfaces 50a and 60a of the mold sections 50 and 60 and interfit with these mold sections in an intimate interlocking relation that secures the sidewalls against movement in spite of the extreme hydraulic pressures encountered during injection of thermoplastic material into the mold cavity. By providing sturdy interlock means or flanges on the first and second mold sections 50 and 60, the necessity of provision of a large steel outer yoke, as is conventional in molds having movable sidewall components, is wholly obviated. This results in a simplification in mold construction as well as a significant reduction in total weight of the mold. This yokeless design feature is disclosed and claimed in an earlier filed co-pending application of Walter R. Lovejoy, now U.S. Pat. No. 3,838,960, and assigned to the same assignee as this application.

The sidewall members are each supported and guided by respective pairs of guide rods of a guide means structure. One guide rod for each of the sidewall members 80 and 82 are visible in FIG. 3, these rods being denoted by the numerals 90 and 92. Similarly, guide rods 92 and 94 constituting one of the pair of guide rods for each of the sidewall members 84 and 86, respectively, are visible in FIG. 4. The remaining rod of each sidewall pair as well as the relative positioning of the rods may be appreciated by reference to FIG. 5 wherein the second rod of each pair is identified by the same numeral as the first identified guide rod of the pair, but with addition of the suffix $a$.

The root portions of each of the guide rods are securely journaled in bores extending through the second mold section 60 with the cantilevered forward portions of the guide rods being inclined outwardly from their respectively adjacent sidewalls of the molded article 10. Each of the guide rods terminates in a respective clearance bore of the first mold section 50, as may be appreciated by reference to FIG. 3 wherein the exemplary guide rods 90, 92 terminate in clearance bores 50$b$ and 50$c$.

Movement of the sidewall members between their open and closed positions is effected by means of mechanical linkages coupled between the respective sidewall elements and an ejection plate 100. For example, linkage elements 102 and 104 each have one end pivotally connected to the ejection plate 100 and their opposite ends pivotally connected to the sidewall members 80 and 82, respectively. Displacement of the ejection plate 100 effects a movement of the sidewall members 80 and 82 by distance corresponding to the movement translated through the mechanical linkages 102 and 104. The movable components of the mold cores are likewise coupled to the ejection plate 100 by suitable linkages, as will presently be explained.

The ejection plate 100 is slidable between a first position shown in FIG. 3 wherein it is adjacent the back plate 66 and a second position wherein plate 100 abuts the back side of the second mold section 60. The ejection plate 100 is displaced between these positions by a piston arm 105 of a conventional hydraulic cylinder 106. The hydraulic cylinder 106 is actuated by a conventional microswitch (not shown) that is positioned so as to be operated when the second mold section 60 reaches a predetermined location in the course of travel between its closed and open positions. The ejection plate 100 is guided in its movement by a series of guide rods, exemplary ones of which, 107 and 108, are visible in FIG. 3. The ends of the guide rods 107 and 108 are secured respectively in the second mold section 60 and the back plate 66.

Referring now to FIG. 4, further elements of the mold 30 are there visible. Specifically, the sidewall members 84 and 86 are pivotally connected by respective linkages 110 and 112 to the ejection plate 100 in the same manner as the sidewall members 80 and 82. The linkage elements 102, 104, 110 and 112 are arranged such that with a given increment of movement of ejection plate 100 all of the sidewall members 80, 82, 84 and 86, respectively, each move an equal longitudinal distance, as is essential to avoid damage to the plastic article 10. In the present embodiment, the guide rods for each of the sidewall members have a like inclination and therefore the sidewalls also move equal lateral distances with a given increment of movement of ejection plate 100.

The two movable components 72 and 74 of the core mold means as well as the fixed core member 70 are likewise visible in FIG. 4. The central core member 70 is of a generally trapezoidal cross-section having opposed sidewalls sloping inwardly toward one another. The core members 72 and 74 are of a right triangular configuration and are disposed with their hypotenuse sidewalls in contiguous relation to the opposed sloping sidewalls of the fixed member 70. The core members 72 and 74 are interlocked to the fixed member 70 through T-type interlock slides 72$a$, 72$b$ and 74$a$, 74$b$, respectively, for permitting a relative sliding movement between the fixed member 70 and the sidewall member 72 and 74. The slides are constructed and arranged such that the surfaces of the movable core members 72, 74 adjacent the fixed core 70 lift clear of engagement with the fixed core as the movable cores are displaced toward their open position, thereby leaving only the slide elements in engagement with one another. This avoids galling of the opposed surfaces of the core members as might otherwise occur if the entire surfaces of the core members remained in sliding engagement.

The core members 72 and 74 are connected by respective pivotally mounted linkage arms 114 and 116 to the ejection plate 100 in a manner identical to that of the sidewalls. The linkage arms 114 and 116 are arranged so that for a given increment of movement of the ejection plate 100 each of the core elements moves longitudinally the same distance as each of the sidewall members despite a disparity in the length of lateral movement between these members. Such is, of course, essential to prevent tearing or other damage to the plastic article 10 during its ejection from the mold. The mechanical linkages provide a highly reliable and economical means for assuring proper coordinated movement of all of the mold components.

As seen in FIG. 5, the four sidewall members 80, 82, 84 and 86 are each formed as generally rectangular blocks and interfit in an overlapping relation, as opposed to a mitred corner interfit, when the mold is in its closed position. The sidewall elements in their closed position of FIG. 5 collectively define the exterior sidewalls inface contour of the mold cavity. Similarly, the core elements 70, 72 and 74 collectively define the interior contour of the mold cavity. A portion of the peripheral flange 22 of article 10 is formed in cooperation with the second mold means 60.

The operation of the mold apparatus of the present invention may best be understood by a consideration of FIGS. 3, 4, 6 and 7. As seen in the section view of FIG. 4, the mold is in a closed position with the mold components collectively defining a mold cavity corresponding to the article 10 of FIG. 1. A thermoplastic material introduced into the primary inlet sprue 36 flows through the five hot runner channels. (43$b$–$d$ visible in FIG. 4) to respective inlets gates and into the mold cavity, three of the gates 46, 47 and 49 being visible in FIG. 4. As previously indicated, there are two additional inlet gates lying in a common plane with gates 46, 47 and 49 for introducing thermoplastic material into the mold cavity. Four of the gates including the gates 47 and 49 define a rectangle while the fifth gate 46 is disposed at the geometric center of the rectangle. However, the particular form of gating is not pertinent to the present invention and other gating techniques may be used according to the peculiarities of the geometry of the article to be molded.

Once injection of the thermoplastic material has been completed and the molded article has solidified, the piston arm 40 of the hydraulic control apparatus 41 is retracted to open the mold and to eject the part therefrom. An appreciation for the manner of operation of the mold in moving between its open and closed position may be had by comparing FIGS. 3 and 4 which depict the mold in its closed position and a partly open position, respectively, with FIG. 6 which depicts the mold in its fully open position. Initially, in opening of the mold, the first and second mold means 50 and 60 separate under the influence of the piston arm 40 drawing the moveable platen 32 and the mold components supported thereon toward the backing plate 39 (FIG. 1). As the opening progresses to a predetermined position somewhat beyond that shown in FIG. 3, a microswitch (not shown) is operated to actuate the hydraulic cylinder 106. The resultant outward movement of the piston 105 of cylinder 106 displaces the ejection plate 100 toward the backside of the second mold means 60 resulting in movement of each of the linkage elements pivotally connected to plate 100 and thus movement of the sidewall and moveable core mold components in a like direction.

Each of the sidewall members 80, 82, 84 and 86 moves along a similar inclined path established by the respective guiderods associated with each sidewall member. The core members 72 and 74 likewise move along inclined paths established by the slope of the opposed surfaces of the fixed core member 70. In order to avoid damage of the molded article 10, it is essential that each of the sidewall and core components move at identical longitudinal rates at least during that time period in which these mold components are in engagement with the molded article 10. To this end, the linkages 102, 104, 110, 112, 114 and 116 are arranged to provide equal increments of longitudinal movement of the mold elements for a given unit of movement of the ejection plate 100, although it will be recognized that the lateral components of movement of the core members are different from the lateral movement components of the sidewall members.

Once the internal core elements 72 and 74 have fully cleared the undercuts in the enclosure surface and the external sidewall members 80, 82, 84 and 86 have done likewise, as seen in FIG. 6, the molded article 10 may be lifted clear of the mold, as indicated schematically by the phantom outline of the article shown in FIG. 6. The mold is then ready for return to its closed position and a repeat cycle of operation.

The use of the stepped sidewalls on the mold means 50 and 60 affords respective interlocks to hold each of the sidewall members secure against the extreme pressures encountered during the injection process. The present design permits this to be accomplished without the use of a massive steel retaining yoke about the sidewalls, as is conventional in the prior art. Additionally, the mold of the present invention utilizes mechanical interlocks between the various mold components simplifying and adding to the reliability of the mold construction and operation.

While particular embodiments of the present invention have been shown and described, it is apparent that various changes and modifications may be made, and it is therefore intended in the following claims to cover all such modifications and changes as may fall within the true spirit and scope of this invention.

I claim:

1. An injection mold for manufacture of a plastic article having plural side walls and only one closed end wall forming a generally polygonal enclosure with an open top, said mold comprising:

first mold means having a mold defining surface corresponding to the exterior dimensions of said end wall and a first portion of the contiguous plural side walls of said article and further having first interlock means;

core mold means comprising a plurality of relatively movable members cooperatively defining a mold core corresponding to the interior dimensions of said article;

second mold means for supporting said core mold means and including second interlock means;

side wall mold means disposed intermediate said first and second mold means and comprising plural separable side wall members movable between a closed position in which said plural members cooperatively form a mold defining surface corresponding to the exterior dimensions of a second portion of the contiguous plural side walls of said article and an open position in which said side wall members are displaced laterally and longitudinally of their closed position, the opposed end portions of said plural side wall members interfitting with respectively said first and second interlock means and the intermediate portions of said side wall members being spaced from both said first and second mold means when said side wall members are in their closed position for securely locating said side wall members against displacement under the influence of plastic injection pressures and said plural side wall members being spaced from each of said first and second interlock means and said first and second mold means when said side wall members are in their open position; and guide means comprising separate guide elements associated with each of said four side wall members for guiding movement of said side wall members between said closed and open positions.

2. The injection mold of claim 1 in which said core mold means includes at least one member longitudinally movable along a path parallel to the longitudinal movement of said four side wall members and further comprising linkage means including separate linkage elements having first ends coupled respectively to said one member and each of said four side wall members and further including ejection plate means movable along a predetermined path and in which each of said separate linkage elements have second, opposite ends coupled to said ejection plate means and in which said linkage elements are constructed and arranged relative to one another for displacing said four side wall members and said one member of said core mold means at an equal longitudinal rate upon movement of said ejection plate means.

3. The injection mold of claim 2 in which said first and second interlock means comprise respective recesses in said first and second mold means and in which respective opposite ends of said four side wall members seat in said recesses to interlock said side wall members with said first and second mold means.

4. The injection mold of claim 3 in which said core mold means comprises a central member of a generally trapezoidal cross-section having opposed side walls sloping inwardly toward one another and a pair of outer core members coupled to said central member for relative sliding movement along said sloped side walls.

5. The injection mold of claim 4 in which each of said outer core members is coupled to one end of a respective one of said separate linkage elements and the respective opposite ends of said linkage elements are coupled to said ejection plate means for displacing said outer core elements at the same longitudinal rate as said four side wall members upon displacement of said ejection plate means.

6. An injection mold for manufacture of a plastic article having four side walls and only one closed end wall forming a generally rectangular enclosure with an open top, said mold comprising:

first mold means having a mold defining surface corresponding to the exterior dimensions of a predetermined portion of said article including said closed end wall;

core mold means comprising a plurality of relatively movable members cooperatively defining in their closed position a mold core corresponding to the interior dimensions of said article, at least one of said plurality of members being displaceable along a predetermined path including both lateral and longitudinal components in moving between said closed position and an open position;

second mold means for supporting said core mold means and being movable relative to said first mold means;

side wall mold means comprising four separable side wall members movable between a closed position in which said four members cooperatively form a mold defining surface corresponding to the exterior dimensions of at least a portion of the contiguous four side walls of said article and an open position in which said side wall members are displaced laterally and longitudinally of their closed position; and ejection means comprising an ejection plate movable between a first and a second position and separate mechanical linkage elements coupled between said ejection plate and said one core mold member and said four side wall members, said linkage elements being constructed and arranged for displacing said one core mold member and said four side wall members at a like longitudinal rate with movement of said ejection plate between said first and second positions.

* * * * *